(12) United States Patent
Azadet et al.

(10) Patent No.: US 8,189,704 B2
(45) Date of Patent: *May 29, 2012

(54) METHOD AND APPARATUS FOR JOINT EQUALIZATION AND DECODING OF MULTILEVEL CODES

(75) Inventors: Kameran Azadet, Morganville, NJ (US); Erich Franz Haratsch, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 626 days.

This patent is subject to a terminal disclaimer.

(21) Appl. No.: 12/359,778

(22) Filed: Jan. 26, 2009

(65) Prior Publication Data

US 2009/0129519 A1   May 21, 2009

Related U.S. Application Data

(63) Continuation of application No. 10/022,659, filed on Dec. 18, 2001, now Pat. No. 7,502,418.

(51) Int. Cl.
*H04L 5/12* (2006.01)
(52) U.S. Cl. ......... 375/265; 375/262; 375/341; 375/316
(58) Field of Classification Search .................. 375/265, 375/262, 341, 316
See application file for complete search history.

(56) References Cited

U.S. PATENT DOCUMENTS

| | | | | |
|---|---|---|---|---|
| 5,031,195 A * | 7/1991 | Chevillat et al. | ............. | 375/234 |
| 5,214,672 A * | 5/1993 | Eyuboglu et al. | ............ | 375/254 |
| 5,432,821 A * | 7/1995 | Polydoros et al. | ........... | 375/340 |
| 5,546,430 A * | 8/1996 | Liao et al. | ..................... | 375/341 |
| 6,038,269 A * | 3/2000 | Raghavan | ...................... | 375/340 |
| 6,081,562 A * | 6/2000 | He et al. | ......................... | 375/341 |
| 6,115,418 A * | 9/2000 | Raghavan | ..................... | 375/233 |
| 6,178,198 B1 * | 1/2001 | Samueli et al. | ............... | 375/214 |
| 6,377,640 B2 * | 4/2002 | Trans | ............................ | 375/354 |
| 6,418,172 B1 * | 7/2002 | Raghavan et al. | ............ | 375/262 |
| 6,477,208 B1 * | 11/2002 | Huff | ............................. | 375/265 |
| 6,690,754 B1 * | 2/2004 | Haratsch et al. | .............. | 375/346 |
| 6,744,831 B2 * | 6/2004 | Chan | ............................. | 375/346 |
| 6,798,828 B1 * | 9/2004 | Phanse | ......................... | 375/219 |

(Continued)

OTHER PUBLICATIONS

Haratsch, "A low complexity joint equalizer and decoder for 1000Base-T Gigabit Ethernet", Proceedings of the IEEE 2000 Custom Integrated Circuits Conference, 2000. CICC, May 21-24, 2000 pp. 465-468.*

(Continued)

*Primary Examiner* — Juan A Torres
(74) *Attorney, Agent, or Firm* — Ryan, Mason & Lewis, LLP

(57) ABSTRACT

A method and apparatus are provided for joint equalization and decoding of multilevel codes, such as the Multilevel Threshold-3 (MLT-3) code, which are transmitted over dispersive channels. The MLT-3 code is treated as a code generated by a finite-state machine using a trellis having state dependencies between the various states. A super trellis concatenates the MLT-3 trellis with a trellis representation of the channel. Joint equalization and decoding of the received signal can be performed using the super trellis. A sequence detector is disclosed that uses the super trellis or a corresponding reduced-state trellis to perform joint equalization and decoding of the received signal to decode the MLT-3 coded data bits. The sequence detector may be embodied using maximum likelihood sequence estimation that applies the optimum Viterbi algorithm or a reduced complexity sequence estimation method, such as the reduced-state sequence estimation (RSSE) algorithm.

20 Claims, 5 Drawing Sheets

U.S. PATENT DOCUMENTS

| | | | | |
|---|---|---|---|---|
| 6,961,392 B2 * | 11/2005 | Heegard et al. | ............... | 375/341 |
| 7,012,976 B1 * | 3/2006 | Tortelier et al. | ............... | 375/341 |
| 2002/0150180 A1 * | 10/2002 | Malmberg et al. | ............ | 375/341 |
| 2003/0053535 A1 * | 3/2003 | Malkov et al. | ................ | 375/233 |
| 2003/0115061 A1 * | 6/2003 | Chen | ............................. | 704/240 |

OTHER PUBLICATIONS

Haratsch, "High-speed VLSI implementation of reduced complexity sequence estimation algorithms with application to Gigabit Ethernet 1000Base-T", International Symposium on VLSI Technology, Systems, and Applications, 1999. Jun. 8-10, 1999 pp. 171-174.*

Eyuboglu, "Reduced-state sequence estimation for coded modulation of intersymbol interference channels". IEEE Journal on Selected Areas in Communications, vol. 7, Issue 6, Aug. 1989 pp. 989-995.*

Eyuboglu, "Reduced-state sequence estimation with set partitioning and decision feedback". IEEE Transactions on Communications vol. 36. Issue 1, Jan. 1988 pp. 13-20.*

Spinnler,"Design of hyper states for reduced-state sequence estimation", IEEE International Conference on Communications. 1995. ICC 95 Seattle, Gateway to Globalization, 1995 vol. 1, Jun. 18-22, 1995 pp. 1-6 vol. 1.*

* cited by examiner

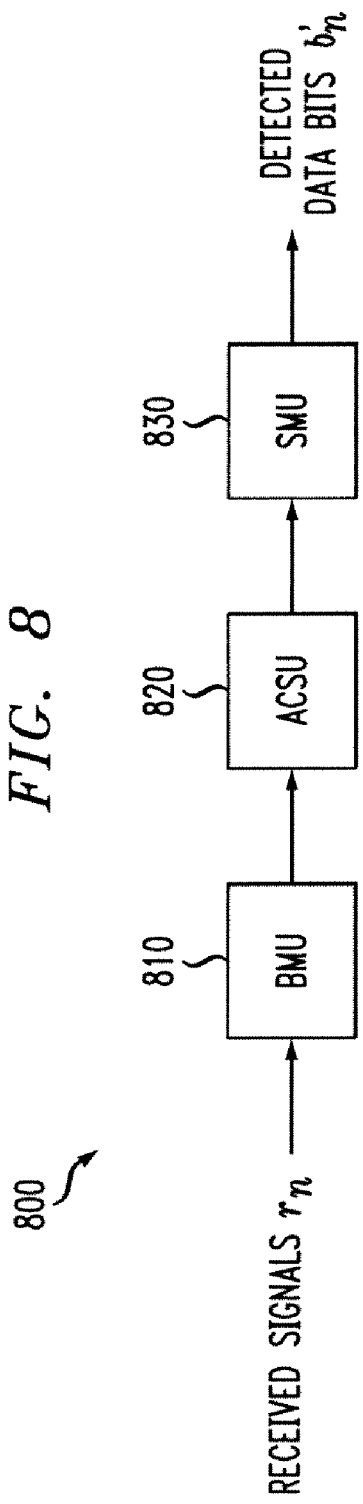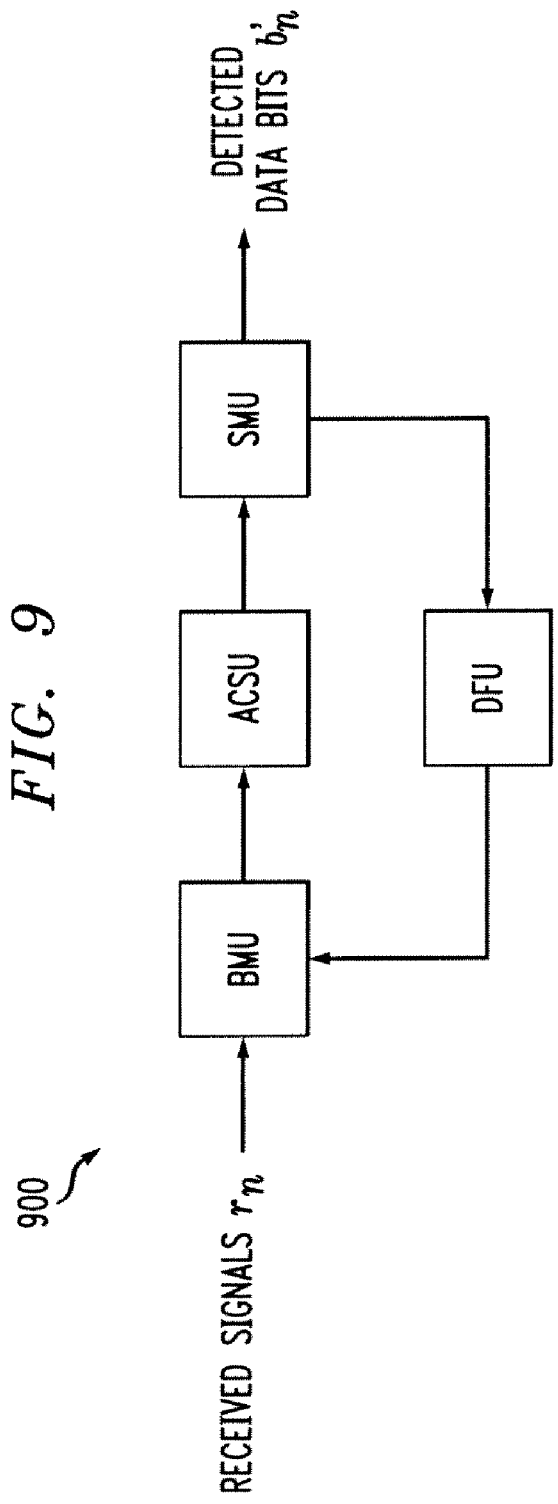

METHOD AND APPARATUS FOR JOINT EQUALIZATION AND DECODING OF MULTILEVEL CODES

CROSS-REFERENCE TO RELATED APPLICATIONS

This application is a continuation of U.S. patent application Ser. No. 10/022,659, filed Dec. 18, 2001 now U.S. Pat. No. 7,502,418, which is incorporated by reference herein.

FIELD OF THE INVENTION

The present invention relates generally to channel equalization and decoding techniques, and more particularly, to methods and apparatus for performing joint equalization and decoding of a multilevel code.

BACKGROUND OF THE INVENTION

The transmission rates for local area networks (LANs) that use unshielded twisted pair cabling have progressively increased from 10 Megabits-per-second (Mbps) to 100 Mbps. Multilevel Threshold-3 (MLT-3) is a bandwidth efficient line code that is employed in one of the most popular data transmission schemes for LANs, i.e., 100 Base-TX Ethernet, which has a data rate of 100 Mbps. FIG. 1 illustrates the mapping of data bits to the corresponding output signals in accordance with the MLT-3 code. As shown in FIG. 1, data bits are encoded in accordance with the MLT-3 code using three signal levels (+1, 0, −1), where a data bit with a logic value of one (1) causes a transition of the MLT-3 signal and a data bit with a logic value of zero (0) leaves the MLT-3 signal unchanged. It is noted, however, that the MLT-3 signal sequences (1, 0, 1), (1, −1), (−1, 0, −1) and (−1, 1) are not allowed according to the MLT-3 code.

When MLT-3 coded signals are transmitted through a dispersive channel, the received signals will be corrupted by intersymbol interference and noise. A number of systems have been disclosed or suggested for processing MLT-3 coded signals, such as those described in U.S. Pat. Nos. 6,115,418 and 6,178,198. FIG. 2 illustrates a receiver architecture 200 that is typical of such prior art receiver designs. As shown in FIG. 2, the exemplary conventional receiver 200 includes an equalizer 210 that cancels the intersymbol interference (ISI) in the received signal, $r_n$. The equalizer 210 can be implemented as a linear equalizer or a decision-feedback equalizer, in a known manner. Thereafter, a three-level slicer 220 performs symbol-by-symbol detection to generate MLT-3 signal values of −1, 0 or 1. Finally, an MLT-3 decoder 250 converts these detected MLT-3 signals into data bits, in accordance with the mapping shown in FIG. 1.

While the receiver architecture 200 shown in FIG. 2 has relatively low complexity, the receiver 200 suffers from a number of limitations, which if overcome, could greatly improve the decoding of MLT-3 signals. Specifically, the receiver architecture 200 shown in FIG. 2 achieves only sub-optimum performance as it performs symbol-by-symbol detection. Thus, conventional MLT-3 receivers, such as the receiver 200 shown in FIG. 2, exhibit unacceptable bit error rates in applications where the channel impairments are severe, as is the case for high-speed data communications over copper. A need therefore exists for an improved receiver architecture for the detection of MLT-3 coded signals in the presence of ISI and noise.

SUMMARY OF THE INVENTION

Generally, a method and apparatus are disclosed for joint equalization and decoding of multilevel codes, such as the MLT-3 code. The present invention recognizes that the MLT-3 code can be treated as a code generated by a finite-state machine using a trellis having state dependencies between the various states. A super trellis is created that concatenates the MLT-3 trellis with a trellis representation of the channel. Once the MLT-3 code and channel are represented as a super trellis, joint equalization and decoding of the received signal can be performed on the super trellis or a corresponding reduced-state trellis. A sequence detector is disclosed that uses the super trellis or the reduced-state trellis to perform joint equalization and decoding of the received signal to decode the MLT-3 transmitted data bits.

In one variation, the sequence detector is embodied as a maximum likelihood sequence estimator (MLSE) that applies the optimum Viterbi algorithm to the super trellis. In a further variation, the sequence detector can be embodied as a sequence estimation method with reduced complexity, such as the reduced-state sequence estimation (RSSE) algorithm or variants thereof.

A more complete understanding of the present invention, as well as further features and advantages of the present invention, will be obtained by reference to the following detailed description and drawings.

BRIEF DESCRIPTION OF THE DRAWINGS

FIG. 8 is a schematic block diagram of a receiver in accordance with one embodiment of the present invention where a Viterbi detector performs maximum likelihood sequence estimation using the super trellis of FIG. 6; and FIG. 9 is a schematic block diagram of a receiver in accordance with another embodiment of the present invention where a reduced-state sequence estimation algorithm performs joint equalization and decoding using a reduced-state trellis corresponding to the super trellis of FIG. 6.

DETAILED DESCRIPTION

Figure 3:
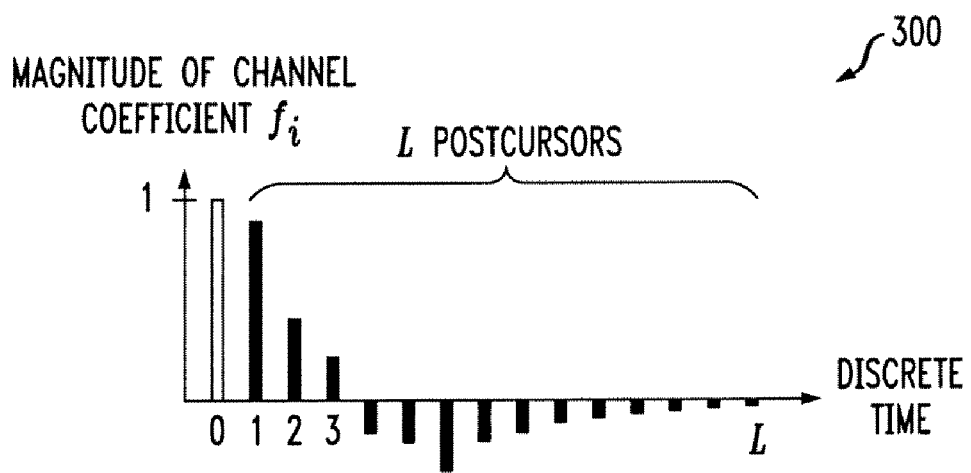
FIG. 3 illustrates an exemplary postcursor channel impulse response for a channel having a memory of length, L.

The present invention recognizes that the MLT-3 code can be treated as a code generated by a finite-state machine having state dependencies between the various states. Thus, according to one aspect of the invention, the MLT-3 code is represented as a trellis and bit error rates are thereby reduced for decoding MLT-3 coded signals in the presence of channel impairments, such as ISI or noise. FIG. 3 illustrates a postcursor channel impulse response 300 having a channel memory of length, L. As shown in FIG. 3, the channel impulse response 300 consists of a main tap corresponding to time 0, and L postcursor taps.

According to another aspect of the invention, joint equalization and decoding of the received signal is performed on a super trellis that concatenates the MLT-3 code trellis with a channel trellis. In this manner, a MLT-3-coded data sequence can be detected in the presence of ISI and noise using maximum likelihood sequence estimation (MLSE), which applies the Viterbi algorithm to the super trellis defined by the concatenation of the MLT-3 code trellis and the channel trellis, or a sequence estimation method with reduced complexity, such as the reduced-state sequence estimation (RSSE) algorithm or variants thereof.

Trellis Representation of the MLT-3 Code

Figure 4:
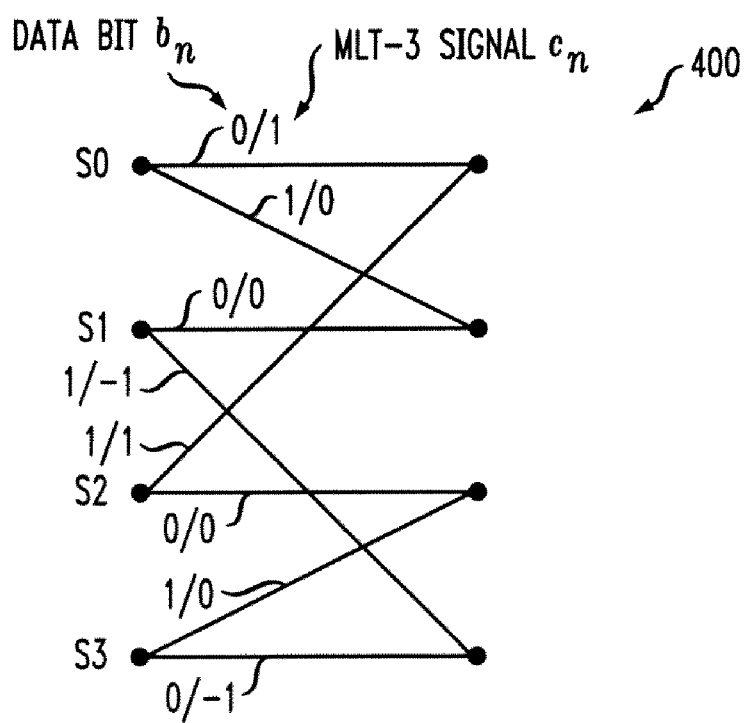
FIG. 4 illustrates a trellis that represents the various states of the MLT-3 code in accordance with the present invention.

FIG. 4 illustrates a trellis 400 that represents the various states, $\sigma_n$, of the MLT-3 code. As shown in FIG. 4, the MLT-3 code trellis 400 comprises four states, S0, S1, S2, and S3. State $\sigma_n$=S0 is associated with a previous MLT-3 signal value of +1. States $\sigma_n$=S1 and $\sigma_n$=S2 are associated with a previous MLT-3 signal value of 0 (increasing and decreasing transitions). State $\sigma_n$=S3 is associated with a previous MLT-3 signal value of −1. There are two branches leaving or entering each state corresponding to the state transitions associated with the data bits 0 and 1, respectively. A data bit with the logic value 1 causes a state transition, and a data bit with the logic value of 0 does not cause a state transition in the MLT-3 code trellis. For example, if the decoder is in State $\sigma_n$=S0 (the previous MLT-3 signal value was +1), and the current data bit to be encoded is a value of one (1), the decoder will encode the signal as an MLT-3 signal value of 0 and transition along the lower branch out of state $\sigma_n$=S0 to the next state $\sigma_{n+1}$=S1.

Figure 5:
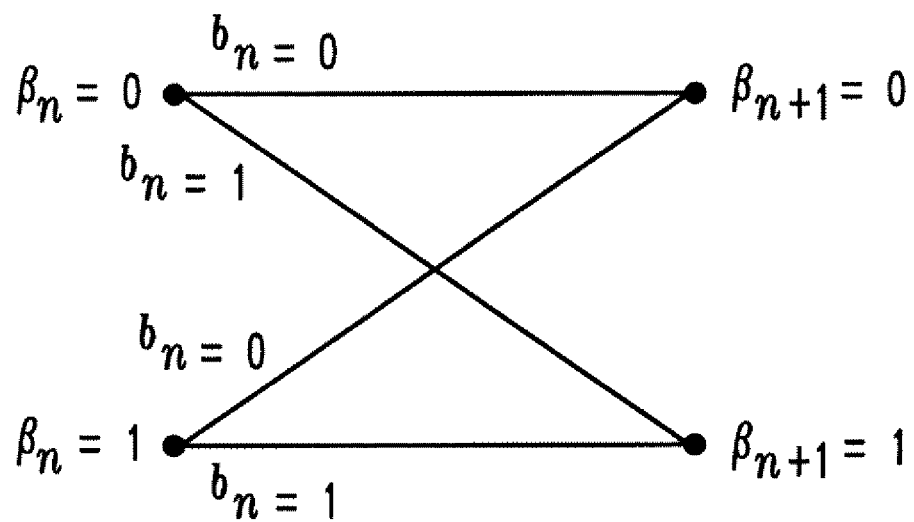
FIG. 5 illustrates a trellis that represents a channel having a channel memory of length one (L=1)

FIG. 5 illustrates a trellis 500 that represents a channel having a channel memory of length one (L=1), such as the channel shown in FIG. 3. In general, for a channel with memory L a channel state $\beta_n$ can be defined as $$\beta_n = (b_{n-1}, b_{n-2}, \ldots, b_{n-L}).$$

As shown in FIG. 5, the trellis 500 for the case that L=1 comprises two states $\beta_n$=0 and $\beta_n$=1. State $\beta_n$=0 is associated with a previous data bit value of zero (0). State $\beta_n$=1 is associated with a previous data bit value of one (1).

Figure 6:
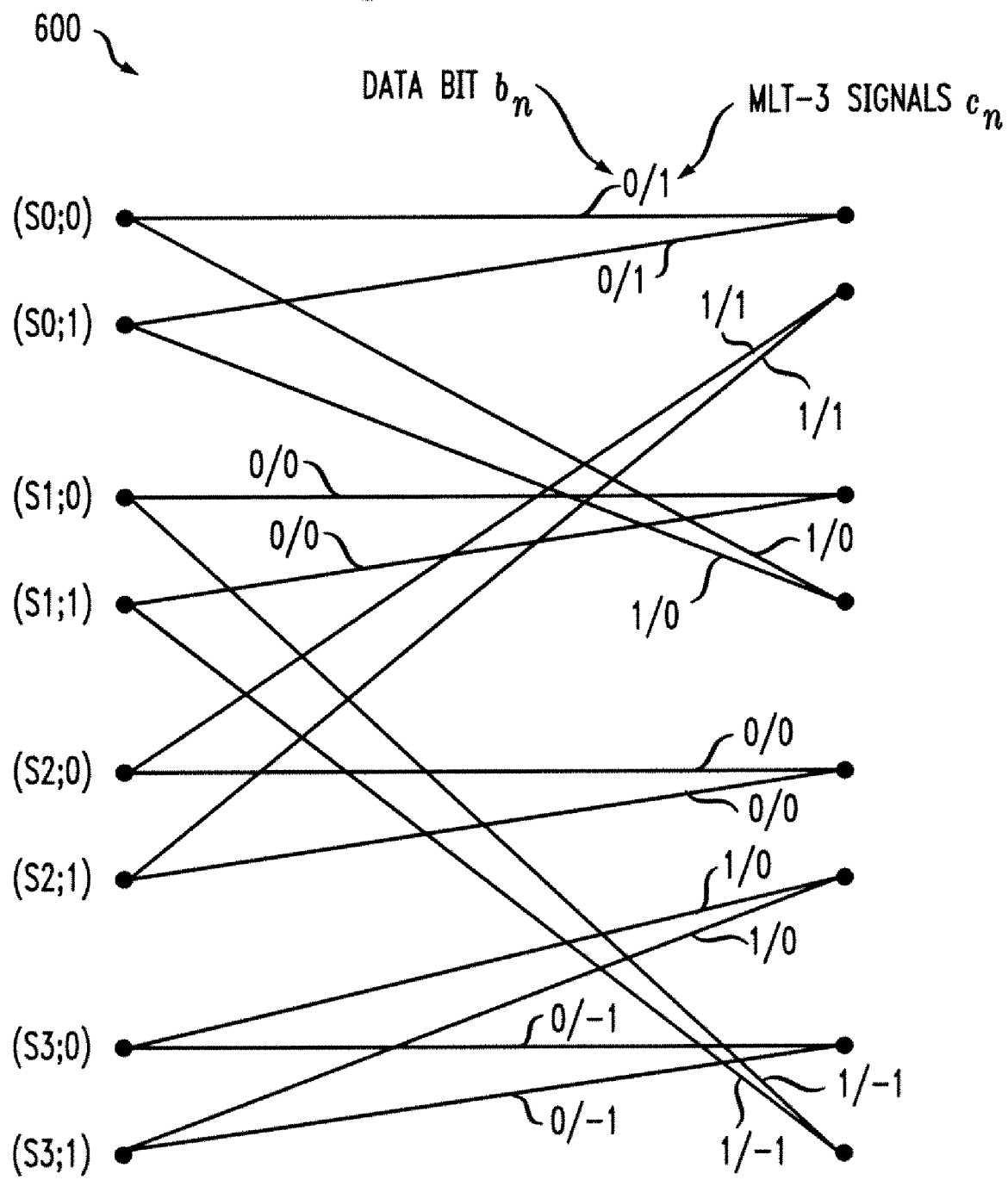
FIG. 6 illustrates a super trellis that concatenates the MLT-3 code trellis of FIG. 4 with the channel trellis of FIG. 5.

FIG. 6 illustrates a super trellis 600 that concatenates the MLT-3 code trellis 400 of FIG. 4 with the channel trellis 500 of FIG. 5. A combined MLT-3/channel state in the super trellis is defined as follows:

$$\rho_n = (\sigma_n; \beta_n) = (\sigma_n; b_{n-1}, b_{n-2}, \ldots, b_{n-L})).$$

It is noted that the number of states in the combined super trellis 600 is $4 \times 2^L$.

Sequence Estimation

Figures 1, 2:
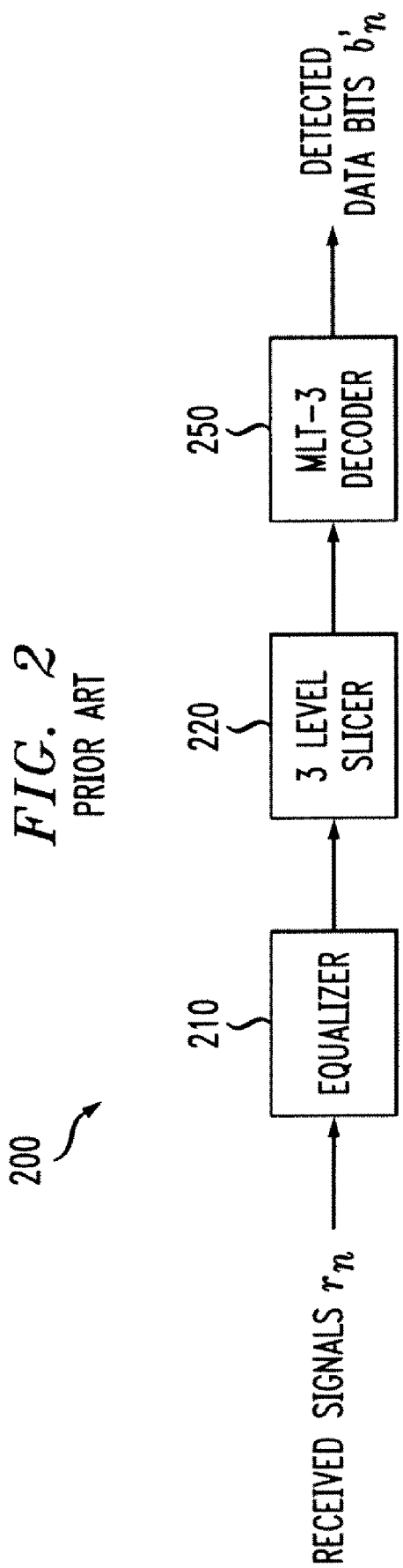
FIG. 1 illustrates a conventional mapping of data bits to corresponding MLT-3 signals in accordance with the MLT-3 line code.
FIG. 2 illustrates a conventional receiver architecture for processing MLT-3 coded signals.
Figure 7:
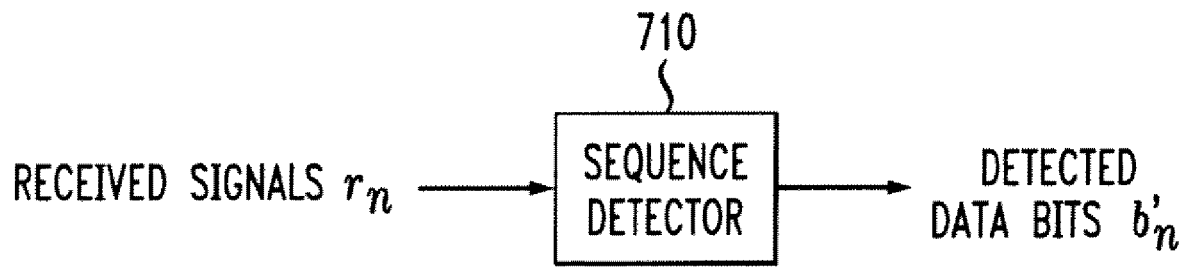
FIG. 7 is a schematic block diagram illustrating a sequence detector that performs joint equalization and decoding of a received signal.

As previously indicated, the present invention performs joint equalization and decoding of the received signal using the super trellis 600 or a corresponding reduced-state trellis. FIG. 7 is a schematic block diagram illustrating a sequence detector 710 that performs joint equalization and decoding of the received signal, $r_n$, to generate the detected data bits, $b_n$. As previously indicated, the sequence detector 710 may be embodied as a Viterbi detector 800, discussed below in conjunction with FIG. 8, that performs maximum likelihood sequence estimation on the super trellis 600 or a reduced-state sequence estimation algorithm 900, discussed below in conjunction with FIG. 9, or a variation thereof. The minimum Euclidean distance between allowable sequences is 2 in the MLT-3 code trellis. Therefore, when there is no ISI, the present invention allows for a decoding gain of 3 dB compared to the above-mentioned conventional technique (see FIG. 2) where only simple symbol-by-symbol detection is being performed. In the presence of ISI, this gain might be even more significant.

FIG. 8 is a schematic block diagram of a receiver 800 in accordance with the present invention, where a Viterbi detector performs maximum likelihood sequence estimation on the super trellis 600. As shown in FIG. 8, the receiver 800 includes a branch metrics unit (BMU) 810, an add-compare-select unit (ACSU) 820 and a survivor memory unit (SMU) 830. The BMU 810 calculates the branch metrics (BMs) for the transition in the super trellis, the ACSU 820 performs the ACS operation for the super trellis states, and the SMU 830 keeps track of the survivor paths.

Generally, the receiver 800 performs data detection using maximum likelihood sequence estimation (MLSE), to produce data bits. In MLSE, all possible sequences are considered and it is determined which sequence was actually transmitted, in a known manner. MLSE is the optimum detection method and an efficient implementation is the Viterbi algorithm. For a more detailed discussion of implementation issues associated with the Viterbi algorithm, see, for example, Gerhard Fettweis and Heinrich Meyr, "High-Speed Parallel Viterbi Decoding Algorithm and VLSI-Architecture," IEEE Communication Magazine (May 1991), incorporated by reference herein.

FIG. 9 is a schematic block diagram of a receiver 900 in accordance with the present invention, where a reduced-state sequence estimation (RSSE) algorithm performs joint equalization and decoding on a reduced-state trellis. Generally, the RSSE algorithm reduces the complexity of MLSE by merging several super trellis states to produce a trellis with a reduced number of states, that may be expressed as follows for the channel shown in FIG. 3:

$$\rho'_n = (\sigma_n; (b_{n-1}, b_{n-2}, \ldots, b_{n-K})), K<L,$$

where K is referred to as truncated channel memory. The number of states in the reduced-state trellis is $4 \times 2^K$. When K is chosen to be 0, the reduced-state trellis simplifies to the MLT-3 code trellis of FIG. 4. In this case, the reduced-state trellis itself does not contain any information about the ISI, which is accounted for on a per-state basis by considering symbols from corresponding survivor paths. It is clear that with an appropriate value for K a trade-off between decoding complexity and performance can be achieved. The closer K is to L, the better the bit error rate performance will be, but the decoding complexity will increase as well.

For a discussion of the RSSE algorithm, as well as the special cases of decision-feedback sequence estimation (DFSE) and parallel decision-feedback decoding (PDFD) techniques, see, for example, P. R. Chevillat and E. Eleftheriou, "Decoding of Trellis-Encoded Signals in the Presence of Intersymbol Interference and Noise", IEEE Trans. Commun., vol. 37, 669-76, (July 1989), M. V. Eyuboglu and S. U. H. Qureshi, "Reduced-State Sequence Estimation For Coded Modulation On Intersymbol Interference Channels", IEEE JSAC, vol. 7, 989-95 (August 1989), or A. Duel-Hallen and C. Heegard, "Delayed decision-feedback sequence estimation," IEEE Trans. Commun., vol. 37, pp. 428-436, May 1989, each incorporated by reference herein. U.S. patent application Ser. No. 09/326,785, filed Jun. 4, 1999 and entitled "Method and Apparatus for Reducing the Computational Complexity and Relaxing the Critical Path of Reduced State Sequence Estimation (RSSE) Techniques," incorporated by reference herein, discloses a modified RSSE technique that reduces the hardware complexity of the conventional RSSE algorithm for a given number of states and also relaxes the critical path problem.

As shown in FIG. 9, the receiver 900 includes a branch metric units (BMU) that calculates the branch metrics based on the received signal, $r_n$. The best surviving paths into reduced states are determined in the add-compare-select unit (ACSU) and then stored in the survivor memory unit (SMU). The decision-feedback unit (DFU) takes the survivor symbols from the SMU to calculate the ISI estimates for the reduced states, which are used by the BMU to calculate the branch metrics for the transitions in the reduced-state trellis. The receiver 900 can be embodied in a similar manner to the 1000BASE-T RSSE decoder described in E. F. Haratsch and K. Azadet, "A 1-Gb/s Joint Equalizer and Trellis Decoder for 1000BASE-T Gigabit Ethernet," IEEE J. Solid-State Circuits, vol. 36, 374-384 (March 2001) or U.S. patent application Ser. No. 09/471,920, filed Dec. 23, 1999, entitled "Method and Apparatus for Shortening the Critical Path of Reduced Complexity Sequence Estimation Techniques," each incorporated by reference herein.

In an alternate implementation, the reduced complexity sequence estimator can employ the M algorithm (as opposed to RSSE) on the super trellis of FIG. 6, where only the M paths with the best path metrics are kept at each decoding step. For a discussion of the M algorithm, see, for example, E. F. Haratsch, "High-Speed VLSI Implementation of Reduced Complexity Sequence Estimation Algorithms With Application to Gigabit Ethernet 1000 Base-T," Int'l Symposium on VLSI Technology, Systems, and Applications, Taipei (June 1999), each incorporated by reference herein.

It is to be understood that the embodiments and variations shown and described herein are merely illustrative of the principles of this invention and that various modifications may be implemented by those skilled in the art without departing from the scope and spirit of the invention.

We claim:

1. A method for decoding a signal received from a dispersive channel causing intersymbol interference, said signal encoded using an MLT-3 code, said method comprising the steps of:
generating a combined trellis representing both said MLT-3 code and said dispersive channel, wherein a state in said combined trellis is given by a concatenation of a MLT-3 code state and a truncated channel state, wherein said truncated channel state partially describes said dispersive channel, wherein a number of states in said combined trellis is given by $4\times(2^K)$, where K is the truncated channel memory, wherein said combined trellis is based on an MLT-3 code trellis, wherein said MLT-3 code uses three signal levels to represent two binary values, wherein said MLT-3 code trellis has a plurality of MLT-3 code trellis states, wherein each of said MLT-3 code trellis states is associated with a value for a signal in a previous symbol period and has at least two branches leaving or entering each state, each of said at least two branches corresponding to state transitions associated with said two binary values, wherein a first binary value substantially always causes a state transition in said MLT-3 code trellis from a first state to a different state and a second binary value does not cause a state transition in said MLT-3 code trellis; and
performing joint equalization and decoding of said received signal using said combined trellis.

2. The method of claim 1, wherein said performing step uses a reduced complexity sequence estimation technique.

3. The method of claim 1, wherein said dispersive channel is an Ethernet channel.

4. The method of claim 1, wherein a first one of said plurality of MLT-3 code trellis states corresponds to a value for a signal in a previous symbol period of +1.

5. The method of claim 1, wherein a second and third of said plurality of MLT-3 code trellis states corresponds to a value for a signal in a previous symbol period of 0.

6. The method of claim 1, wherein a fourth one of said plurality of MLT-3 code trellis states corresponds to a value for a signal in a previous symbol period of −1.

7. The method of claim 1, further comprising the step of combining said MLT-3 code trellis with a channel trellis representing said dispersive channel to obtain said combined trellis.

8. The method of claim 1, further comprising the steps of computing ISI estimates for said states using symbols from corresponding survivor paths; computing branch metrics for transitions in said trellis based on said ISI estimates; determining survivor paths into said states based on said branch metrics; and storing said survivor paths.

9. A receiver for processing a signal received from a dispersive channel, said signal encoded using an MLT-3 code, comprising:
a sequence detector that performs joint equalization and decoding of said received signal using a combined trellis representing both said MLT-3 code and said dispersive channel, wherein a state in said combined trellis is given by a concatenation of a MLT-3 code state and a truncated channel state, wherein said truncated channel state partially describes said dispersive channel and wherein a number of states in said combined trellis is given by $4\times(2^K)$, where K is the truncated channel memory, wherein said sequence detector further comprises:
a branch metric units (BMU) that calculates branch metrics based on said received signal;
an add-compare-select unit (ACSU) that determines the best surviving paths into said trellis states; and
a survivor memory unit (SMU) that stores said best surviving paths.

10. The receiver of claim 9, wherein said sequence detector employs a reduced complexity sequence estimator.

11. The receiver of claim 9, further comprising a decision-feedback unit (DFU) that takes survivor symbols from said SMU to calculate ISI estimates for said states, wherein said ISI estimates are used by said BMU to calculate branch metrics for transitions in said combined trellis.

12. The receiver of claim 9, wherein said dispersive channel is an Ethernet channel.

13. The receiver of claim 9, wherein said combined trellis is based on an MLT-3 code trellis, wherein said MLT-3 code uses three signal levels to represent two binary values, wherein said MLT-3 code trellis has a plurality of MLT-3 code trellis states, wherein each of said MLT-3 code trellis states is associated with a value for a signal in a previous symbol period and has at least two branches leaving or entering each state, each of said at least two branches corresponding to state transitions associated with said two binary values, wherein a first binary value substantially always causes a state transition in said MLT-3 code trellis from a first state to a different state and a second binary value does not cause a state transition in said MLT-3 code trellis.

14. A method for decoding a signal received from a dispersive channel causing intersymbol interference, said signal encoded using an MLT-3 code, said method comprising the steps of:
generating a combined trellis representing both said MLT-3 code and said dispersive channel, wherein a state in said combined trellis is given by a concatenation of a MLT-3 code state and a truncated channel state, wherein said truncated channel state partially describes said dispersive channel, wherein a number of states in said combined trellis is given by $4\times(2^K)$, where K is the truncated channel memory, wherein said dispersive channel is an Ethernet channel; and performing joint equalization and decoding of said received signal using said combined trellis.

15. The method of claim 14, wherein said performing step uses a reduced complexity sequence estimation technique.

16. The method of claim 14, wherein said combined trellis is based on an MLT-3 code trellis, wherein said MLT-3 code uses three signal levels to represent two binary values, wherein said MLT-3 code trellis has a plurality of MLT-3 code trellis states, wherein each of said MLT-3 code trellis states is associated with a value for a signal in a previous symbol period and has at least two branches leaving or entering each state, each of said at least two branches corresponding to state transitions associated with said two binary values, wherein a first binary value substantially always causes a state transition in said MLT-3 code trellis from a first state to a different state and a second binary value does not cause a state transition in said MLT-3 code trellis.

17. The method of claim 16, wherein a first one of said plurality of trellis states corresponds to a value for a signal in a previous symbol period of +1.

18. The method of claim 16, wherein a second and third of said plurality of trellis states corresponds to a value for a signal in a previous symbol period of 0.

19. The method of claim 16, wherein a fourth one of said plurality of trellis states corresponds to a value for a signal in a previous symbol period of −1.

20. The method of claim 14, further comprising the steps of computing ISI estimates for said states using symbols from corresponding survivor paths; computing branch metrics for transitions in said combined trellis based on said ISI estimates; determining survivor paths into said states based on said branch metrics; and storing said survivor paths.

\* \* \* \* \*